June 8, 1937.  M. SCHUMACHER  2,082,982

KITCHEN TOOL

Filed May 23, 1934

INVENTOR
Madeleine Schumacher
BY
Edward E. Varnot
ATTORNEY

Patented June 8, 1937

2,082,982

UNITED STATES PATENT OFFICE 2,082,982

KITCHEN TOOL

Madeleine Schumacher, Seattle, Wash.

Application May 23, 1934, Serial No. 727,067

6 Claims. (Cl. 146—31)

My invention relates to kitchen tools and especially is directed to improved structure the object of which is to more efficiently extract the core, pit, seed, or seeds from fruit such as apples, tomatoes, pears, peaches, grapes, and the like.

More particularly stated, it is an especial object of my invention to provide a device of this character peculiarly designed to enable removal of the heart portion of fruit with ease and rapidity and without loss of the juices of the fruit.

A further and particular object of my invention is the provision of a device so formed as to allow penetration thereby of the skin of fruit, the heart portion of which is to be extracted, without bruising the flesh.

A still further and particular object of my invention is the provision of a device capable of extracting the fruit center by penetrating one end only of the fruit and wherein the opening thereby formed is of small dimensions in producing a fruit which in appearance is especially attractive for table use in that the fullness of the same in its natural state is retained.

Still further objects and advantages will, together with the foregoing, become apparent in the course of the following detailed description and claims, the invention consisting in the novel construction, adaptation, and arrangement of parts hereinafter described and claimed.

In the drawing:—

Figure 1:
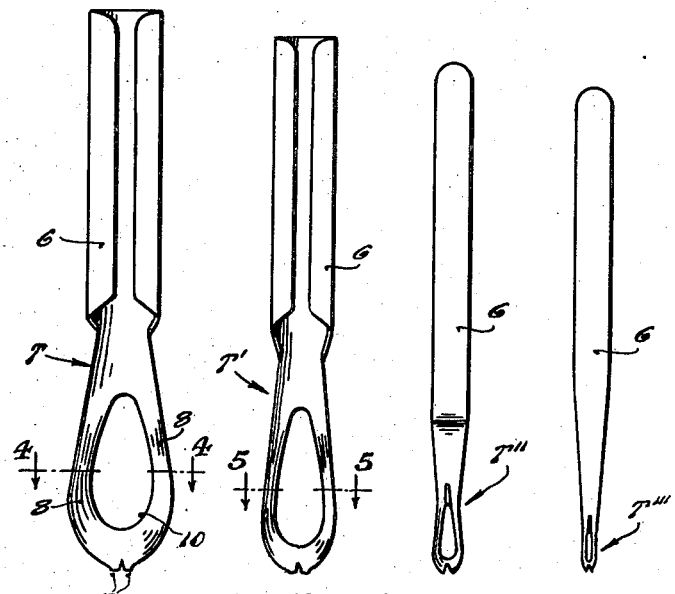
Figure 1 is a top plan view representing a plurality of forms of the invention, each designed in size and shape to specific varieties of fruit.
Figure 2:
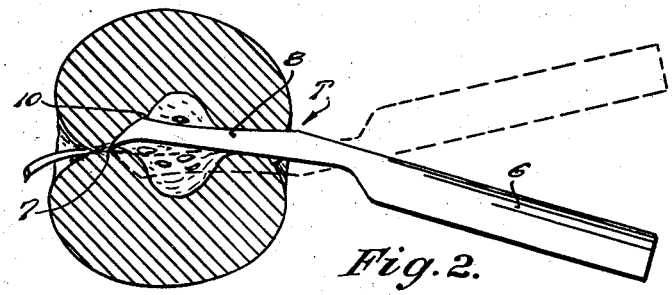
Fig. 2 is a side elevational view indicating the application of one of the forms of the invention for removing the core from an apple.
Figure 3:
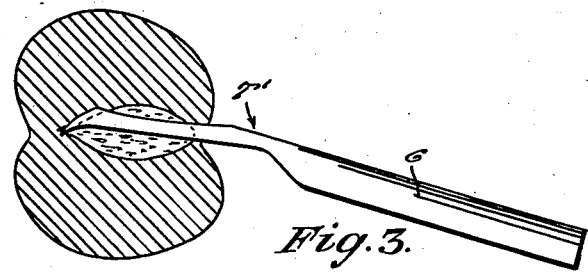
Figure 4:
Figure 5:

Fig. 3 is a view similar to Fig. 2 indicating the application of a modified form in extracting the pit from a peach; and Figs. 4 and 5 are transverse vertical sections taken on the respective section lines 4—4 and 5—5 of Fig. 1, representing the side wall contour of the tools shown in Figs. 2 and 3.

For illustrative purposes only, I have selected four forms of the invention and represent the same in Fig. 1 by the letters T, T', T'', and T''', the same being utilized, respectively, for de-coring an apple, de-pitting a peach, depitting a cherry, and de-seeding a grape. Each form represented is provided with a handle 6 and a concave spoon-shaped head of a relative ovate plan configuration.

Having particular reference to the form T, the handle thereof desirably extends at an angle as regards the general plane of the head and I design said head portion with its lateral edges rectilineal and diverging outwardly from the handle to a line of greatest width which lies slightly forward of the transverse medial center. The tool at such point of its head portion is of a width capable of spanning the approximate diametrical dimensions of the core of an apple and extends forwardly therefrom along curvilinear lines to terminate in a bifurcate end. The slit formed thereby is preferably of a V-form and the furcate terminals lying at opposite sides of the slit and indicated by 7 project beyond the surface plane of the lateral edges of the head portion to produce a relative hook end. Said edges of the tool head, from the base of the slit to points relatively in proximity of the handle, are bevelled or otherwise treated to provide a knife-edge periphery, said edge operating to cut the flesh surrounding the core in separating the flesh from the core In the bottom of the tool, a material portion of the metal is removed in providing an elongated relative egg-shaped opening 10. The walls 8 of the tool extending between said opening and the knife-edge periphery are relatively steep and conform, generally, to the arc of a circle the center of which lies approximately in the surface plane of the head portion.

The design of the tool utilized for the removal of peach pits, represented by T', is in general form similar to the de-coring tool described, the side walls having less inclination in conforming to the surface contour of a peach pit and the transverse dimensions being reduced. The major distinction between such forms and those represented by T'' and T''' is in the hook end, the latter terminating in substantially perpendicular points and being provided with flat handles with trough-forming channels leading to the inner ends of the apertures of the bottoms.

In using the de-coring tool T, the points 7 are inserted through the skin at the blossom side of the apple by holding the handle at an angle of approximately 90° as respects the center line of the fruit. The points are forced inwardly as the handle is elevated and, as full penetration is completed, the points have embraced a longitudinal arc surrounding the core of the apple with the lower or stem end of the core being undercut, the V-slit straddling that portion of the stem which extends to the core. The tool subsequently is turned about the center of the apple as an axis in severing the flesh from the core. As the tool is extracted, the hook end engages below the core to remove the same. In de-coring fruit, it is especially advantageous that the portion of the stem within the fruit be left intact in order that an opening will not develop in the stem end, the sugar, spices, and the like with which the apple is filled in baking being prevented from leaking, together with the juices, from the apple.

In the extraction of pits from peaches, as with the removal of plum, cherry, and other fruit stones, the tool is introduced from the stem end of the fruit and the flesh cut from one side of the pit, removed, and again introduced in a reversed position to sever the pit from the flesh clinging to the opposite side. The terminal points 7 operate in a similar manner to that of the de-corer in undercutting the lower end of the stone and act as a hook in dislodging the stone as the tool is withdrawn.

The grape de-seeder I use similarly to a crochet needle with the hook end of the tool being utilized to pick the seeds from the grape. Currants are similarly treated.

In a manner believed obvious, the juice of the fruit runs freely through the openings in the bottom of the tools as well as through the V-slit as the core, pit, or seed is being extracted. Such openings, moreover, further serve to prevent the development of suction as the tool is being withdrawn, and allow protrusion of the core, pit, or seed into and through the same, maintaining, especially as regards apples and pears, the core intact by preventing a mashing of the same. In some fruits, especially olives where the flesh splits readily, the aperture through the bottom has been found to be essential in allowing the flesh to extend through the same into close proximity of the stone. The aperture in such case is made especially large and I have also found it advantageous to provide a cylindrical handle therefor, the rear end of which is formed with a cutting edge adapted to make an initial circular opening serving to guide the tool which is turned about the stone.

When using the tool, the operator may rapidly displace cores, pits, or seeds which tend to adhere to the tool by running the finger under the aperture in the bottom, in such manner preventing possibility of cutting the fingers on the knife-edge periphery.

It is to be noted that the tool operates in an especially advantageous manner as a paring implement, the knife edge being used to peel and the skin feeding through the aperture as the successive peeling is removed.

While indicating the invention in the now preferred form, it is my intention that the same be limited only within the scope of the hereto annexed claims, and it is believed obvious that the tool may be used, with equally satisfactory results, with vegetables as well as with fruits.

What I claim is:

1. A kitchen tool for the purpose described comprising a member formed with a spoon-shaped head portion having a relative ovate plan configuration and a handle for said head portion, the leading end of said head portion being bifurcated with the furcate points projecting upwardly beyond the plane of the edges of the body proper of the head portion, said tool about the rim of the head portion providing a knife-edge and being apertured in the bottom of said head portion to provide a longitudinally extending opening, said handle extending rearwardly at an angle to said plane of the edges of the head portion.

2. A kitchen tool for the purpose described comprising a member having a relative spoon-shaped head portion provided with an opening through the bottom of the same and having furcate points at the outer end located at opposite sides of the longitudinal median line of the head portion, said furcate points projecting upwardly beyond the plane of the lateral edges of the head portion to extend over and beyond the longitudinal center line of the work to operate as a relative hook in facilitating the extraction of a core or pit, as the case may be, from the work.

3. The structure as defined in claim 2, wherein the leading edges of the head portion which extend from opposite sides of the points form a relatively blunt angle to facilitate penetration of the tool through the skin of easily bruised fruits.

4. A kitchen tool for the purpose described comprising a member having a relative spoon-shaped head portion provided with an opening through the bottom of the same and having furcate points at the outer end located at opposite sides of the longitudinal median line of the head portion, the cut forming said points emanating on the approximate plane of the lateral edges of the head portion with the furcate points projecting upwardly beyond said plane and having a relatively steep inclination to operate as a hook in facilitating the extraction of the core or pit from the work.

5. A kitchen tool for the purpose described providing a working head of a relative ovate plan configuration dished to present a relative spoon-shaped implement of which the side walls are relatively steep, the leading end of said head portion being hooked upwardly to extend beyond the plane in which the lateral edges of the implement lie and being formed with a relative V-slit, the inner terminus of said slit lying approximately in said plane of the lateral edges.

6. A kitchen tool for the purpose described comprising a member formed with a dished head portion and having a handle extending from said head portion, the rim of said head portion providing a relative knife edge with the leading end being formed with furcate points projecting upwardly beyond the plane of the lateral edges of the head portion, said handle for the tool extending rearwardly and upwardly at an angle to said plane of the lateral edges.

MADELEINE SCHUMACHER.